United States Patent
Kwon et al.

(10) Patent No.: US 10,310,709 B2
(45) Date of Patent: Jun. 4, 2019

(54) IMAGE DISPLAY APPARATUS AND METHOD OF DISPLAYING IMAGE FOR DETERMINING A CANDIDATE ITEM TO SELECT

(71) Applicant: SAMSUNG ELECTRONICS CO., LTD., Suwon-si (KR)

(72) Inventors: Sung-hyuk Kwon, Suwon-si (KR); Jeong-hye Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 162 days.

(21) Appl. No.: 15/273,144

(22) Filed: Sep. 22, 2016

(65) Prior Publication Data

US 2017/0185245 A1    Jun. 29, 2017

(30) Foreign Application Priority Data

Dec. 23, 2015  (KR) .................. 10-2015-0185097

(51) Int. Cl.
| | | |
|---|---|---|
| *H04N 21/41* | (2011.01) | |
| *G06F 3/0482* | (2013.01) | |
| *H04N 21/422* | (2011.01) | |
| *H04N 21/482* | (2011.01) | |

(52) U.S. Cl.
CPC ....... *G06F 3/0482* (2013.01); *H04N 21/4126* (2013.01); *H04N 21/42204* (2013.01); *H04N 21/4821* (2013.01)

(58) Field of Classification Search
CPC ............... G06F 3/0482; G06F 3/04812; G06F 3/04842; H04N 21/4126; H04N 21/42204; H04N 21/4821
See application file for complete search history.

(56) References Cited

U.S. PATENT DOCUMENTS

| | | | |
|---|---|---|---|
| 6,622,306 B1 | 9/2003 | Kamada | |
| 6,892,360 B1* | 5/2005 | Pabla | G06F 3/0482 715/802 |
| 2006/0184966 A1* | 8/2006 | Hunleth | G06F 3/017 725/39 |
| 2007/0067744 A1* | 3/2007 | Lane | G06F 3/0236 715/860 |
| 2007/0216641 A1* | 9/2007 | Young | G06F 3/038 345/156 |
| 2008/0178124 A1* | 7/2008 | Kondo | G06F 3/04892 715/856 |
| 2008/0216121 A1* | 9/2008 | Schwarz | H04N 5/44543 725/44 |

(Continued)

FOREIGN PATENT DOCUMENTS

| | | |
|---|---|---|
| KR | 10-0314308 B1 | 11/2001 |
| KR | 10-2015-0094214 A | 8/2015 |

*Primary Examiner* — Amy M Levy
(74) *Attorney, Agent, or Firm* — Sughrue Mion, PLLC

(57) ABSTRACT

An image display apparatus and a method of displaying an image are disclosed. The image display apparatus includes a display configured to display a plurality of items and display an item selected from among the plurality of items with a highlight, a detector configured to detect a user input for moving the highlight, and a controller configured to determine candidate items to which the highlight is to be moved in response to the user input, select one of the candidate items based on information about a moving path of the highlight, and move the highlight to a selected candidate item.

12 Claims, 15 Drawing Sheets

(56) References Cited

U.S. PATENT DOCUMENTS

| | | | |
|---|---|---|---|
| 2009/0113330 A1* | 4/2009 | Garrison | G06F 3/0486 715/769 |
| 2009/0153478 A1* | 6/2009 | Kerr | H04N 5/4403 345/158 |
| 2010/0262933 A1* | 10/2010 | Kim | G06F 3/0481 715/810 |
| 2010/0333141 A1* | 12/2010 | Kang | H04N 5/4401 725/44 |
| 2011/0302532 A1* | 12/2011 | Missig | G06F 3/0416 715/823 |
| 2012/0005058 A1* | 1/2012 | Buck | G06Q 40/04 705/37 |
| 2012/0120316 A1* | 5/2012 | Lee | H04N 21/42204 348/564 |
| 2012/0287150 A1* | 11/2012 | Huang | G06F 3/04817 345/619 |
| 2013/0074013 A1* | 3/2013 | Tapiola | G06F 3/04883 715/859 |
| 2013/0148026 A1* | 6/2013 | Jeong | H04N 5/50 348/570 |
| 2013/0167084 A1* | 6/2013 | Miyake | G06F 3/0482 715/810 |
| 2013/0212624 A1* | 8/2013 | Okada | H04N 21/482 725/52 |
| 2014/0184501 A1* | 7/2014 | Moon | H04N 21/42222 345/157 |
| 2015/0095953 A1* | 4/2015 | Cheon | H04N 21/4828 725/53 |
| 2015/0193036 A1* | 7/2015 | Yoo | G06F 3/017 345/173 |
| 2015/0289024 A1* | 10/2015 | Yoon | H04L 67/02 725/40 |
| 2016/0077686 A1* | 3/2016 | Cosio | H04N 21/42204 715/825 |

* cited by examiner

IMAGE DISPLAY APPARATUS AND METHOD OF DISPLAYING IMAGE FOR DETERMINING A CANDIDATE ITEM TO SELECT

CROSS-REFERENCE TO RELATED APPLICATION

This application claims the benefit of Korean Patent Application No. 10-2015-0185097, filed on Dec. 23, 2015, in the Korean Intellectual Property Office, the disclosure of which is incorporated herein in its entirety by reference.

BACKGROUND

1. Field

The present disclosure relates to an image display apparatus and a method of displaying an image, and more particularly, to an image display apparatus that may move a highlight in a direction corresponding to a user input, and a method of displaying an image.

2. Description of the Related Art

Image display apparatuses have functions that display images viewable by users. The users may watch broadcasts through the image display apparatuses. The image display apparatuses display, on screens, broadcasts selected by the users from among broadcast signals transmitted from broadcasting stations. Broadcasts are globally being changed from analog broadcasts to digital broadcasts.

The digital broadcasts transmit digital video and audio signals. Compared with the analog broadcasts, the digital broadcasts are strong to external noise and thus have less data loss. Also, in the digital broadcasts, errors are easily corrected, resolutions are high, and clear images are provided. Furthermore, unlike the analog broadcasts, the digital broadcasts can provide bidirectional services.

Recently, smart televisions (TVs) provide various items of content in addition to functions of the digital broadcasts. Instead of being passively operated according to user selection, the smart TVs aim to analyze user needs and provide what users want without user manipulation.

SUMMARY

Additional aspects will be set forth in part in the description which follows and, in part, will be apparent from the description, or may be learned by practice of the presented embodiments.

According to an aspect of an exemplary embodiment, an image display apparatus includes a display configured to display a plurality of items and display an item selected from among the plurality of items with a highlight, a detector configured to detect a user input for moving the highlight, and a controller configured to determine candidate items to which the highlight is to be moved in response to the user input, select one of the candidate items based on information about a moving path of the highlight, and move the highlight to the selected candidate item.

The controller may be configured to select an item at which a change in location of the highlight in a direction perpendicular to a direction corresponding to the user input is minimized.

The controller may be configured to calculate a variance or a standard deviation of the moving path of the highlight with regard to each of the candidate items based on the information about the moving path of the highlight and coordinates of the candidate items, and to select an item having a smallest variance or standard deviation from among the candidate items.

The controller may be configured to select a leftmost item or an uppermost item from among the candidate items when the change in location of the highlight with regard to each of the candidate items is identical.

The information about the moving path of the highlight may include history data and coordinates of an item on which the highlight is currently located, and the history data may include coordinates of items on which the highlight was located before the highlight is moved to a current location.

The image display apparatus may further include a memory configured to store a preset number of pieces of the history data.

The controller may be configured to initialize the history data when a direction corresponding to the user input is changed to a direction perpendicular to a direction in which the highlight is moved.

The candidate items may include items contacting an item on which the highlight is currently located with respect to a direction in which the highlight is moved.

The display may be configured to display the plurality of items in a 2-dimensional (2D) grid form.

The detector may be configured to detect a user input for moving the highlight in one of an upward direction, a downward direction, a leftward direction, and a rightward direction.

According to an aspect of another exemplary embodiment, a method of displaying an image includes displaying a plurality of items and displaying an item selected from among the plurality of items with a highlight; detecting a user input for moving the highlight, determining candidate items to which the highlight is to be moved, in response to the user input, selecting one of the candidate items based on information about a moving path of the highlight, and moving the highlight to the selected candidate item.

The selecting of one of the candidate items may include selecting an item at which a change in location of the highlight is minimized in a direction perpendicular to a direction corresponding to the user input.

The selecting of one of the candidate items may further include calculating a variance or a standard deviation of the moving path of the highlight with regard to each of the candidate items based on the information about the moving path of the highlight and coordinates of the candidate items, and selecting an item having a smallest variance or standard deviation from among the candidate items.

The selecting of one of the candidate items may further include selecting a leftmost item or an uppermost item from among the candidate items when the change in location of the highlight with regard to each of the candidate items is identical.

The information about the moving path of the highlight may include history data and coordinates of an item on which the highlight is currently located, and the history data may include coordinates of items on which the highlight was located before the highlight is moved to a current location.

The method may further include initializing the history data when a direction corresponding to the user input is changed to a direction perpendicular to a direction in which the highlight is moved.

The candidate items may include items contacting an item on which the highlight is currently located with respect to a direction in which the highlight is moved.

The displaying of the plurality of items may include displaying the plurality of items in a 2-dimensional (2D) grid form.

The detecting of the user input may include detecting a user input for moving the highlight in one of an upward direction, a downward direction, a leftward direction, and a rightward direction.

BRIEF DESCRIPTION OF THE DRAWINGS

These and/or other aspects will become apparent and more readily appreciated from the following description of the exemplary embodiments, taken in conjunction with the accompanying drawings in which.

DETAILED DESCRIPTION

Figure 1A:
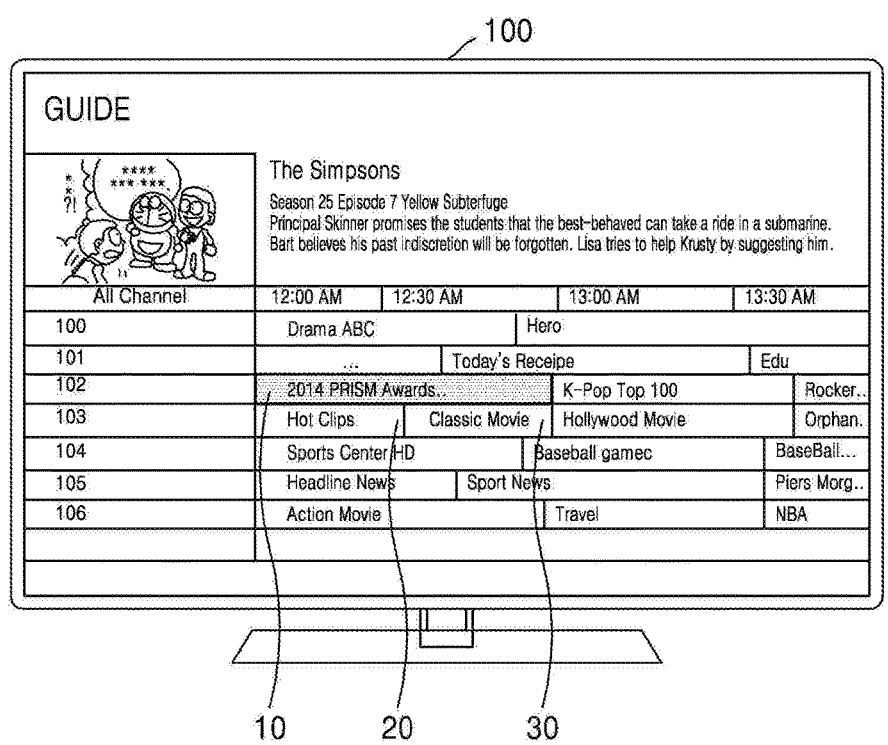
FIGS. 1A to 1C are diagrams of an image display apparatus according to an exemplary embodiment.
Figure 1A:
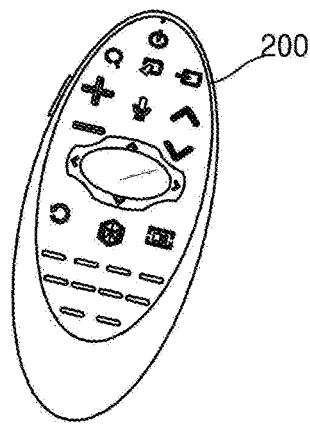

The terms used herein will be briefly described, and then the present disclosure will be described in detail. As used herein, the term "and/or" includes any and all combinations of one or more of the associated listed items. Expressions such as "at least one of", when preceding a list of elements, modify the entire list of elements and do not modify the individual elements of the list The terms used in this specification are those general terms currently widely used in the art in consideration of functions regarding the present disclosure, but the terms may vary according to the intention of those of ordinary skill in the art, precedents, or new technology in the art. Also, specified terms may be selected by the applicant, and in this case, the detailed meaning thereof will be described in the detailed description of the present disclosure. Thus, the terms used in the specification should be understood not as simple names but based on the meaning of the terms and the overall description of the present disclosure.

Throughout the specification, when a portion "includes" an element, another element may be further included, rather than excluding the existence of the other element, unless otherwise described.

The terms "unit", "module", etc. are units for processing at least one function or operation and may be implemented as hardware, software, or a combination of hardware and software.

The present disclosure will now be described more fully with reference to the accompanying drawings, in which exemplary embodiments of the present disclosure are shown. The present disclosure may, however, be embodied in many different forms and should not be construed as being limited to the exemplary embodiments set forth herein. For clarity, portions of the drawings that are not related to the descriptions of the present disclosure are omitted, and like reference numerals in the drawings denote like elements.

Figure 1B:
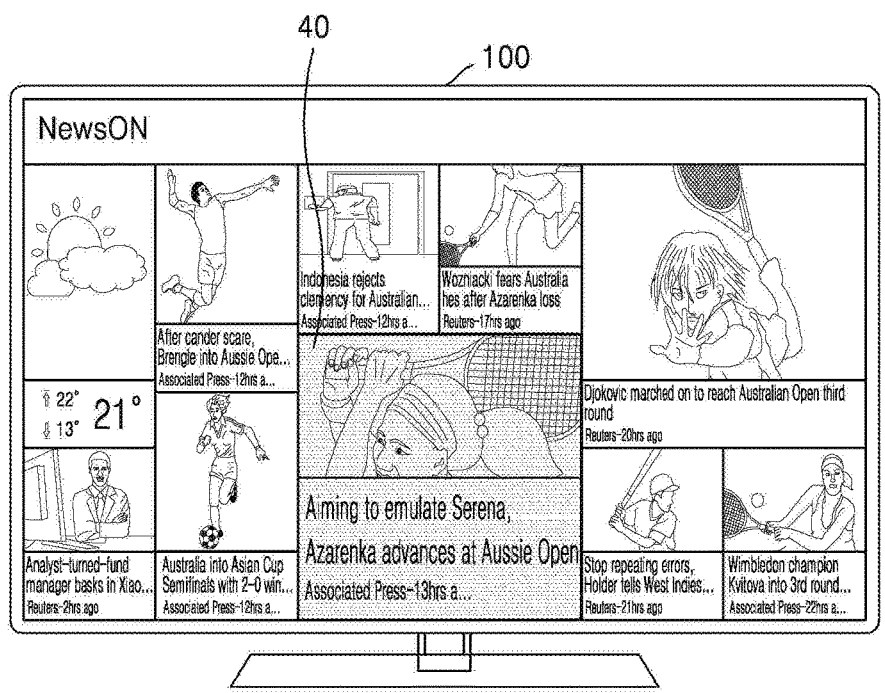
Figure 1B:
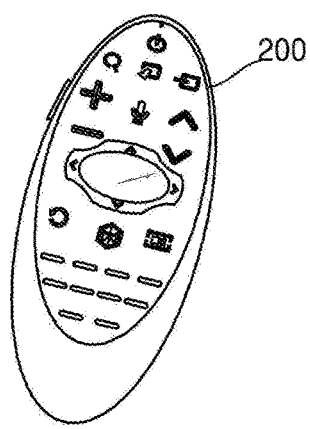
Figure 1C:
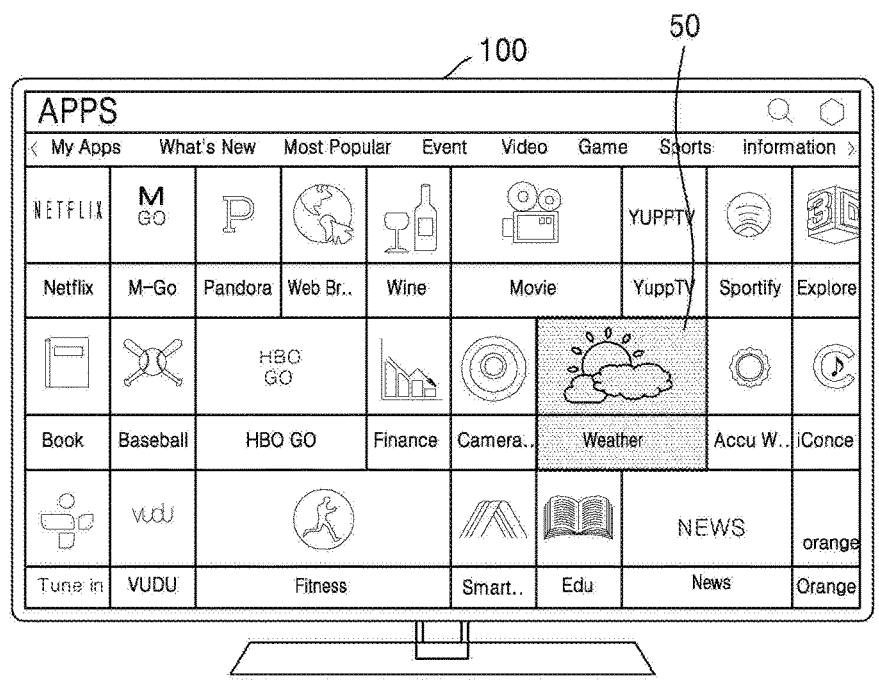
Figure 1C:
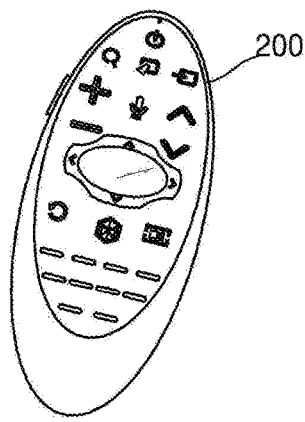

FIGS. 1A to 1C are diagrams of an image display apparatus 100 according to an exemplary embodiment.

As shown in FIGS. 1A to 1C, the image display apparatus 100 may be a TV, but it is merely an example. The image display apparatus 100 may be embodied as an electronic device including a display unit. For example, the image display apparatus 100 may be embodied as various electronic devices such as a mobile phone, a tablet PC, a digital camera, a camcorder, a laptop computer, a desktop computer, an e-book terminal, a digital broadcast terminal, a personal digital assistant (PDA), a portable multimedia player (PMP), a navigation device, an MP3 player, or a wearable device. Also, the image display apparatus 100 may be of a fixed type or a portable type and may be a digital broadcast receiver capable of receiving digital broadcasts.

The image display apparatus 100 may be embodied as a flat image display apparatus, a curved image display apparatus having a curvature, or a flexible image display apparatus having an adjustable curvature. Output resolutions of the image display apparatus 100 may include high definition (HD), full HD, ultra HD, or a resolution higher than the ultra HD.

A control device 200 may be embodied as various devices such as a remote control or a mobile phone and may control the image display apparatus 100.

Also, the control device 200 may control the image display apparatus 100 via short-range communication including infrared communication or Bluetooth. The control device 200 may control the image display apparatus 100 by using at least one of a key (including a button), a touch pad, a microphone (not shown) that may receive a user's voice, and a sensor (not shown) that may detect a motion of the control device 200.

The control device 200 may include a power on/off button for turning on/off power of the image display apparatus 100. Also, according to a user input, the control device 200 may change channels of the image display apparatus 100, adjust volumes, select terrestrial broadcasts/cable broadcasts/satellite broadcasts, or change the configuration of the image display apparatus 100.

Also, the control device 200 may be a pointing device. For example, the control device 200 may operate as a pointing device when a certain key input is received.

In the present specification, the term "user" denotes a person who controls functions or operations of the image display apparatus 100 by using the control device 200 and may include a viewer, an administrator, or an installation engineer.

The image display apparatus 100 may display items on a screen. The items may include items in a 2-dimensional (2D) grid form. For example, the items may include items about programs broadcasted on TV channels such as an electronic program guide (EPG), images regarding news, or icons indicating applications. However, the present disclosure is not limited thereto.

Referring to FIG. 1A, the image display apparatus 100 may display an EPG showing respective broadcast programs by using items having lengths corresponding to running times of the broadcast programs. When the image display apparatus 100 displays the EPG, the broadcast programs have different running times, and thus sizes of the displayed items may not be identical to each other. When the image display apparatus 100 displays an item selected from among the items as a highlight and moves the highlight according to a user input, the highlight may not be moved according to a user's intention.

For example, as shown in FIG. 1A, when the highlight is located on a certain item 10, and when a user input for selecting a key indicating a downward direction on the control device 200 is detected, the image display apparatus 100 may move the highlight to an item 20 or an item 30.

Also, referring to FIG. 1B, the image display apparatus 100 may display items indicating pieces of news. For example, the image display apparatus 100 may display weather information, real-time news, and information from each field as respective images, but the present disclosure is not limited thereto.

The image display apparatus 100 may display an image 40 selected from among the images as a highlight and may move the highlight according to a user input. The images indicating the pieces of news may have different sizes according to displayed information. Accordingly, when the highlight is moved in response to the user input, the highlight may be moved differently from a user's intention.

Referring to FIG. 1C, the image display apparatus 100 may display icons indicating applications and display an icon 50 selected from among the icons as a highlight. In this case, the icons may have different sizes, depending on the applications. Accordingly, when the highlight is moved in response to the user input, the highlight may be moved differently from a user's intention.

Figure 2:
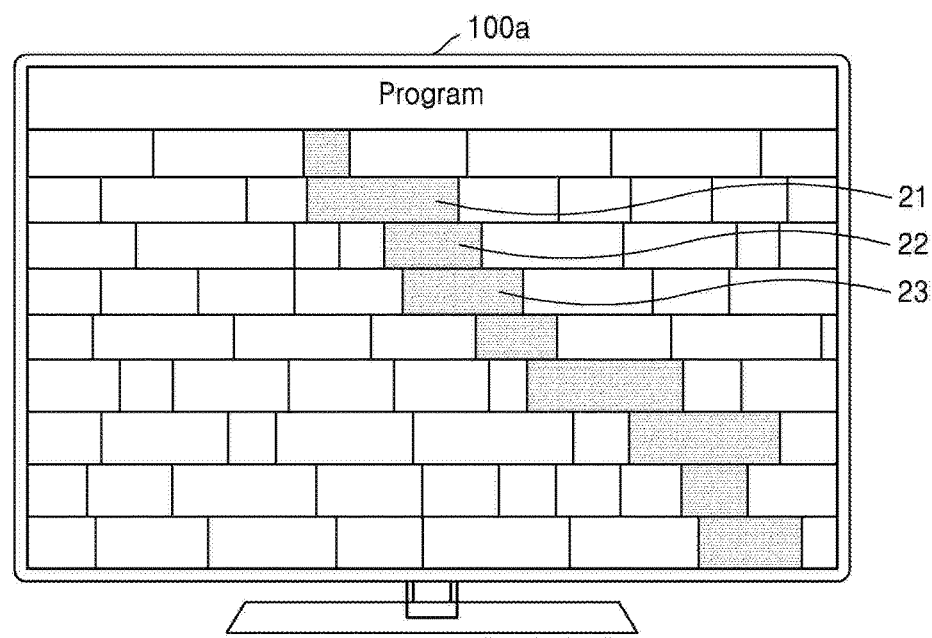
FIG. 2 is a diagram of an example of a method of moving a highlight.
Figure 2:
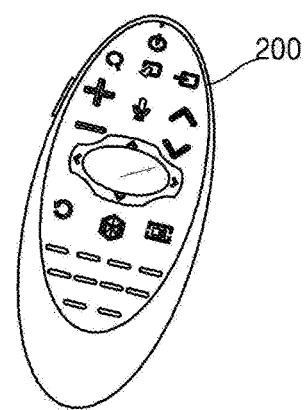

FIG. 2 is a diagram of an example in which a highlight is moved based on information about a currently-located item.

Referring to FIG. 2, when a user input for selecting a key indicating a downward direction on the control device 200 is detected, and when there are at least two items to which a highlight may be moved, an image display apparatus 100a may select a rightmost item.

For example, when a user input for selecting the key indicating the downward direction is detected while an item 21 is being highlighted, the image display apparatus 100a may move the highlight to an item 22. When the user input for selecting the key indicating the downward direction is detected again while the item 22 is being highlighted, the image display apparatus 100a may move the highlight to an item 23. When the user input for selecting the key indicating the downward direction on the control device 200 is repeatedly detected, the image display apparatus 100a may obliquely move the highlight in a rightward direction differently from the user's intention.

Therefore, a method of moving a highlight based on detected user inputs according to a user's intention may be required.

Figure 3:
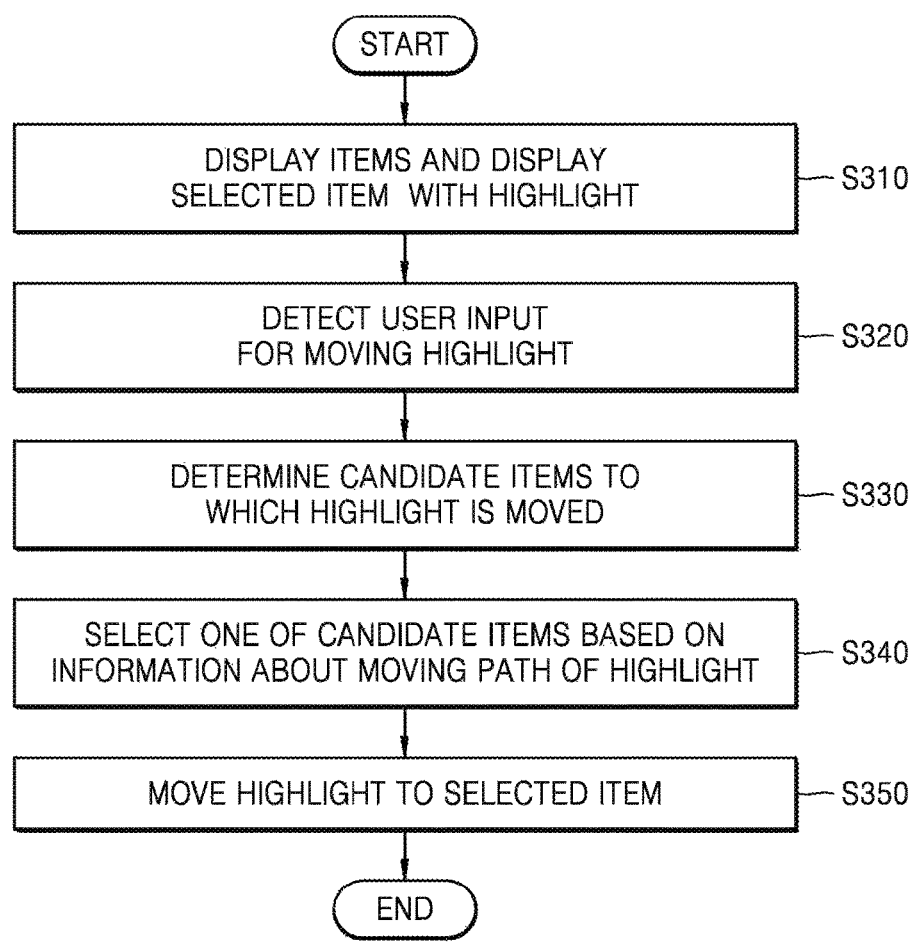
FIG. 3 is a flowchart of a method of displaying an image according to an exemplary embodiment.

FIG. 3 is a flowchart of a method of displaying an image according to an exemplary embodiment.

In operation S310, the image display apparatus 100 displays items and displays an item selected from among the items with a highlight. The items may include elements of the EPG which indicate respective pieces of program information, images and icons indicating applications. However, the present disclosure is not limited thereto.

The image display apparatus 100 may display an item selected from among items with a highlight. In this case, the highlight may distinguish a selected item from the rest of items by using colors or boundary lines, but the present disclosure is not limited thereto.

In operation S320, the image display apparatus 100 may detect a user input for moving the highlight. The image display apparatus 100 may detect a user input from the control device 200 such as a remote control or a mobile phone. In this case, the user input may include an input for selecting any one of keys in four directions of the control device 200.

In operation S330, the image display apparatus 100 may determine candidate items to which the highlight may be moved. The candidate items may be items contacting an item on which the highlight is currently located, in directions in which the highlight may be moved. For example, when the highlight is moved in a downward direction, the candidate items may be items contacting a bottom portion of the item on which the highlight is currently located. Therefore, when items having different sizes, for example, items in an irregular grid form, are displayed, at least two candidate items may exist.

In operation S340, the image display apparatus 100 may select one of the candidate items based on information about a moving path of the highlight.

The information about the moving path of the highlight may include history data and coordinates of the item on which the highlight is currently located. The history data may include coordinates of items on which the highlight was located before the highlight is moved to a current location.

The coordinates of an item may be coordinates of a central point of a region of the screen which is physically occupied by the item. However, the present disclosure is not limited thereto. For example, the coordinates of an item may be coordinates of a top left point of the region of the screen which is physically occupied by the item. A method of indicating the coordinates of an item will be described later.

The image display apparatus 100 may select an item, at which a change in location of the highlight in a direction perpendicular to a direction corresponding to a user input is minimized, based on the information about the moving path of the highlight. The change in location of the highlight may be calculated based on a variance or a standard deviation. However, the present disclosure is not limited thereto.

For example, the image display apparatus 100 may calculate a variance or a standard deviation of the moving path of the highlight with regard to each candidate item, based on the information about the moving path of the highlight and coordinates of the candidate items. The image display apparatus 100 may move the highlight to an item having a minimum standard deviation or a minimum variance among the candidate items.

In operation S350, the image display apparatus 100 may move the highlight to the selected item.

The image display apparatus 100 may select one of the candidate items based on the information about the moving path of the highlight and may move the highlight to the selected item according to the user's intention.

Hereinafter, the method of displaying an image will be described in more detail with reference to FIGS. 4A to 5B.

Figure 4A:
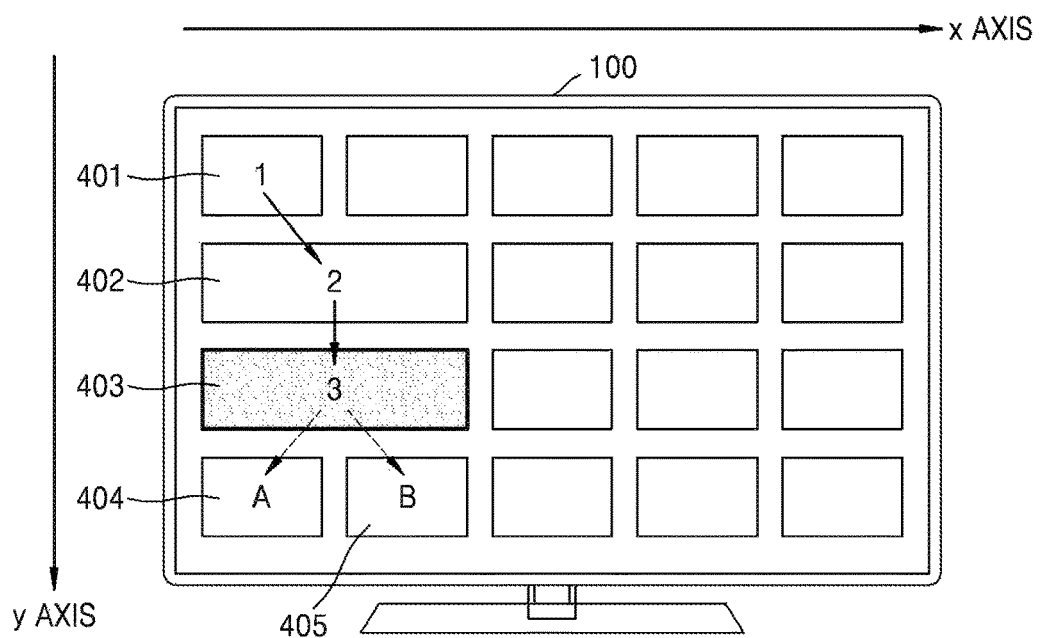
FIGS. 4A to 5B are diagrams of a method of displaying an image according to an exemplary embodiment.
Figure 4A:
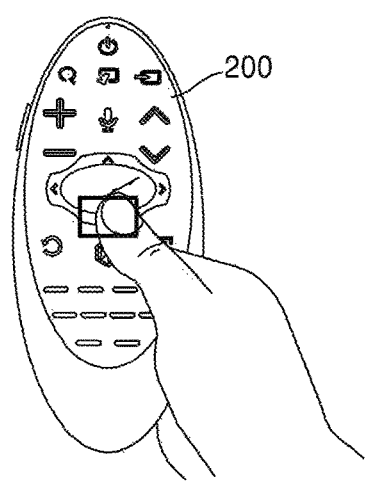
Figure 4B:
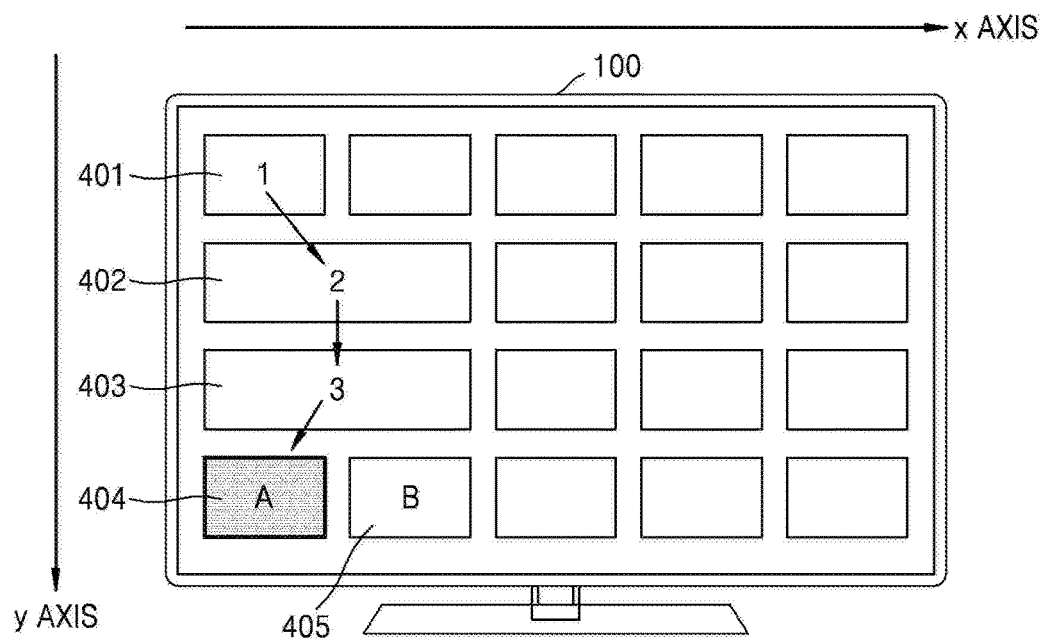
Figure 4B:
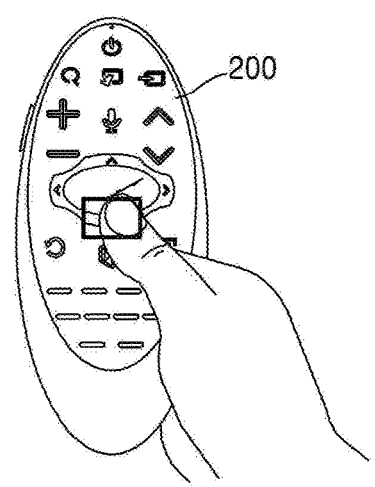

FIGS. 4A and 4B are diagrams of an example of moving, by the image display apparatus 100, a highlight upwards/downwards, according to an exemplary embodiment.

For example, as shown in FIG. 4A, the highlight is moved from an item 1 401 to an item 2 402 and then may be located on a current item 3 403. As a user input corresponding to a downward direction is detected, the image display apparatus 100 may move the highlight located on the item 3 403 downwards. Since the highlight is moved downwards, candidate items may be an item A 404 and an item B 405 which are close to a bottom portion of the item 3 403.

The image display apparatus 100 may select an item, at which the change in location of the highlight is minimized, from among candidate items (e.g., the item A 404 and the item B 405) in a direction perpendicular to a direction corresponding to the user input.

Referring to FIG. 4A, the direction corresponding to the user input is a y-axis direction, and the direction perpendicular to the y-axis direction is an x-axis direction. Accordingly, the image display apparatus 100 may select an item, at which the change in location of the highlight is minimized in the x-axis direction, from among the candidate items (e.g., the item A 404 and the item B 405).

The change in location of the highlight in the x-axis direction may be indicated by a variance or a standard deviation calculated based on the information about the moving path of the highlight and the coordinates of the candidate items. However, the present disclosure is not limited thereto. Hereinafter, for convenience, a case where the change in location of the highlight is indicated by the variance will be described.

Referring to FIG. 4A, the information about the moving path of the highlight may include history data and coordinates of the item 3 403 on which the highlight is currently located. As described above, since the history data may include coordinates of the items on which the highlight was located before the highlight is moved to the current location, the history data may include coordinates of the item 1 401 and the item 2 402.

For example, when the highlight is moved to the item A 404, the change in location of the highlight in the x-axis direction may be shown as follows.

$$\frac{(x(A)-E1(x))^2+(x(3)-E1(x))^2+(x(2)-E1(x))^2+(x(1)-E1(x))^2}{4}$$

For convenience, x-axis coordinates of the item 1 401, the item 2 402, the item 3 403, and the item A 404 may be expressed as $x(1)$, $x(2)$, $x(3)$, and $x(4)$, respectively. Also, an average value of the $x(1)$, $x(2)$, $x(3)$, and $x(4)$ may be expressed as $E1(x)$.

When the highlight is moved to the item B 405, the change in location of the highlight in the x-axis direction may be shown as follows.

$$\frac{(x(B)-E2(x))^2+(x(3)-E2(x))^2+(x(2)-E2(x))^2+(x(1)-E2(x))^2}{4}$$

In the above formula, the x-axis coordinate of the item B 405 may be expressed as $x(B)$, and an average value of the $x(1)$, $x(2)$, $x(3)$, and $x(B)$ may be expressed as $E2(x)$.

Referring to FIG. 4B, since a variance when the highlight is moved to the item A 404 is smaller than a variance when the highlight is moved to the item B 405, the image display apparatus 100 may move the highlight to the item A 404.

When the changes in location of the highlight are the same with regard to respective candidate items, the image display apparatus 100 may select a leftmost item from among the candidate items according to settings. For example, referring to FIG. 4B, when the variances of the highlight which indicate the change in location of the highlight when the highlight is moved to the item A 404 or the item B 405 are the same, the image display apparatus 100 may select the item A 404 that is a leftmost candidate item. However, criteria for selecting an item may differ depending on settings, and the image display apparatus 100 may select a rightmost item (e.g., the item B 405) from among the candidate items when the changes in location of the highlight are the same.

Figure 5A:
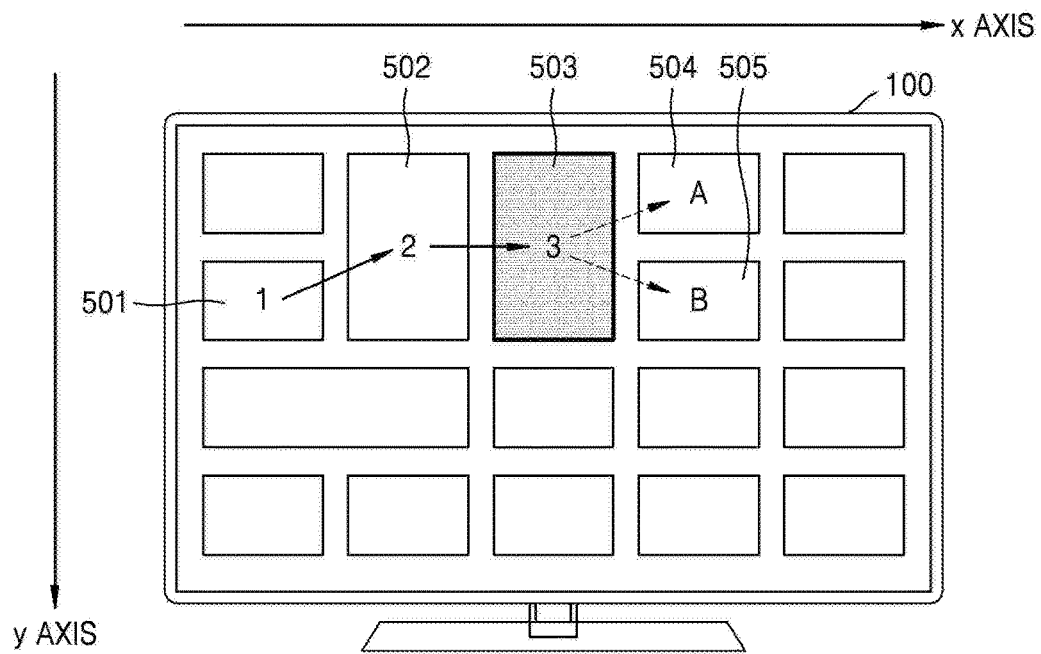
Figure 5A:
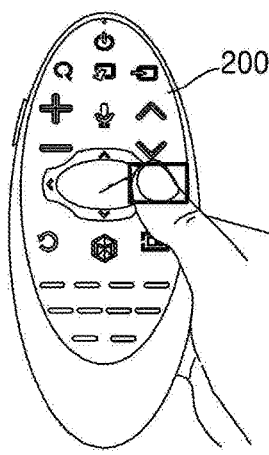
Figure 5B:
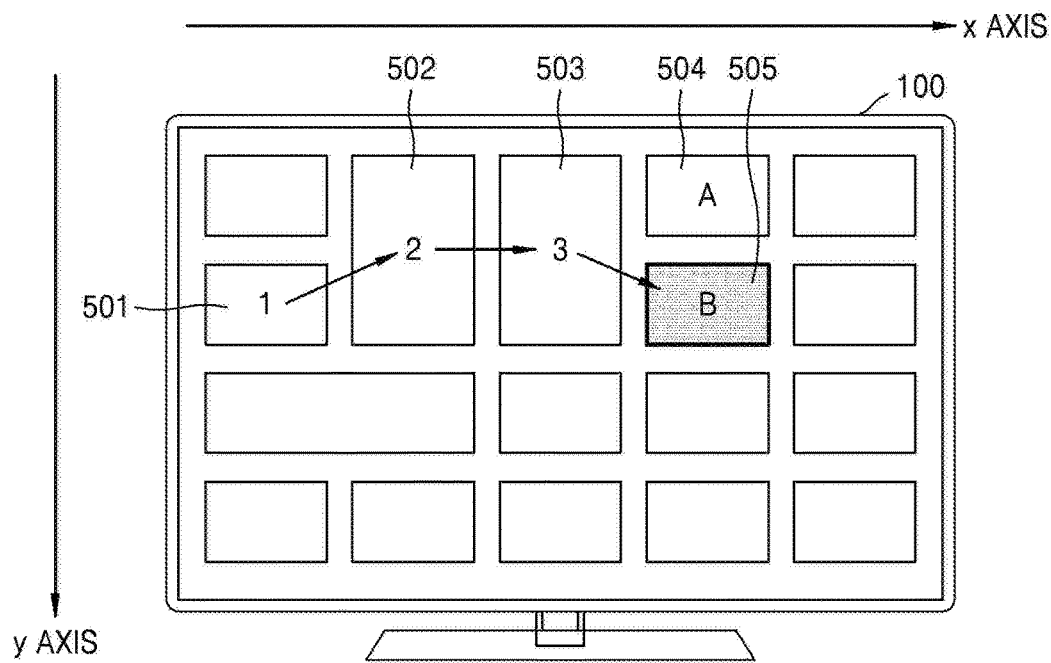
Figure 5B:
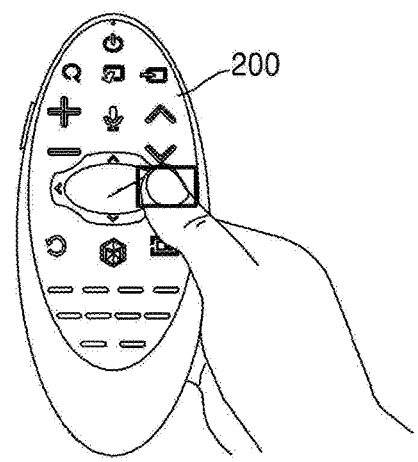

FIGS. 5A and 5B are diagrams of an example of moving, by the image display apparatus 100, a highlight leftwards/rightwards, according to an exemplary embodiment.

For example, as shown in FIG. 5A, the highlight may be located on a current item 3 503 after the highlight is moved from an item 1 501 to an item 2 502. As a user input corresponding to a rightward direction is detected, the image display apparatus 100 may move the highlight rightwards from the item 3 503. Since the highlight is moved rightwards, candidate items may be an item A 504 and an item B 505 which are close to a right portion of the item 3 503.

The image display apparatus 100 may select an item, at which the change in location of the highlight is minimized, from among the candidate items (e.g., the item A 504 and the item B 505) in a direction perpendicular to a direction corresponding to a user input.

Referring to FIG. 5A, the direction corresponding to the user input is an x-axis direction, and the direction perpendicular to the x-axis direction is a y-axis direction. Accordingly, the image display apparatus 100 may select an item, at which the change in location of the highlight is minimized in the y-axis direction, from among the candidate items (e.g., the item A 504 and the item B 505).

As described above, the change in location of the highlight in the y-axis direction may be indicated by the variance or the standard deviation calculated based on the information about the moving path of the highlight and coordinates of the candidate items. However, the present disclosure is not limited thereto.

For example, when the highlight is moved to the item A 504, the change in location of the highlight in the y-axis direction may be shown as follows.

$$\frac{(y(A)-E1(y))^2+(y(3)-E1(y))^2+(y(2)-E1(y))^2+(y(1)-E1(y))^2}{4}$$

In the above formula, y-axis coordinates of the item 1 501, the item 2 502, the item 3 503, and the item A 504 may be indicated as $y(1)$, $y(2)$, $y(3)$, and $y(A)$, respectively. Also, an average value of the $y(1)$, $y(2)$, $y(3)$, and $y(A)$ may be indicated as $E1(y)$. When the highlight is moved to the item B 505, the location change of the highlight in the y-axis direction may be indicated as follows.

$$\frac{(y(B)-E2(y))^2+(y(3)-E2(y))^2+(y(2)-E2(y))^2+(y(1)-E2(y))^2}{4}$$

In the above formula, a y-axis coordinate of the item B 505 may be indicated as $y(B)$, and an average value of the $y(1)$, $y(2)$, $y(3)$, and $y(B)$ may be indicated as $E2(y)$.

Referring to FIG. 5B, since the variance when the highlight is moved to the item B 505 is smaller than the variance when the highlight is moved to the item A 504, the image display apparatus 100 may move the highlight to the item B 505.

When the changes in location of the highlight are the same with regard to respectively candidate items, the image display apparatus 100 may select an uppermost item from among the candidate items according to settings. For example, referring to FIG. 5B, when the highlight is moved to the item A 504 or the item B 505, and when the variances indicating the changes in location of the highlight are the same, the image display apparatus 100 may select the item A 504 that is the uppermost item. However, the criteria for selecting an item may differ depending on settings, and the present disclosure is not limited to the above described examples. For example, the image display apparatus 100 may select a lowermost item (e.g., the item B 505) from among the candidate items when the changes in location of the highlight are the same.

Figure 6:
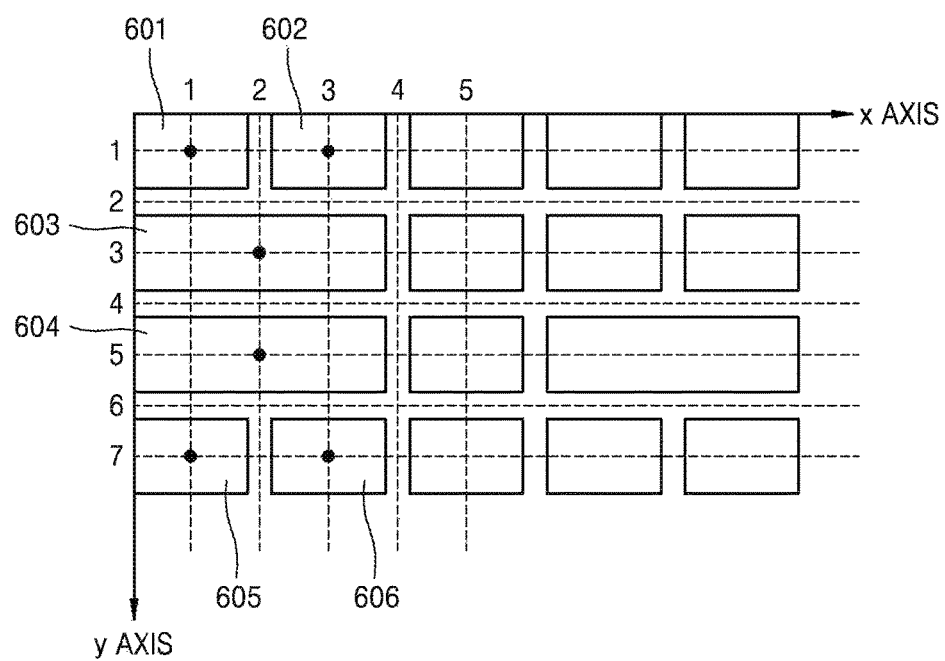
FIG. 6 is a diagram for explaining coordinates of items according to an exemplary embodiment.

FIG. 6 is a diagram of a method of indicating coordinates of items on the image display apparatus 100 according to an exemplary embodiment.

As described above, the image display apparatus 100 may select one of the candidate items based on the information about the moving path of the highlight and the coordinates of the items. The information about the moving path of the highlight may be indicated by using the coordinates of the items.

As shown in FIG. 6, when the items are displayed on the screen, the image display apparatus 100 may represent coordinates of each item as an x-axis coordinate and a y-axis coordinate. In this case, the coordinates of the item may be coordinates of a central portion in a region occupied by each item.

For example, referring to FIG. 6, coordinates of an intersection point at which an x axis crosses a y axis may be indicated as (0, 0). Also, coordinates of an item 601 may be indicated as (1, 1), coordinates of an item 602 may be indicated as (3, 1), coordinates of an item 603 may be indicated as (2, 3), coordinates of an item 604 may be indicated as (2, 5), coordinates of an item 605 may be indicated as (1, 7), and coordinates of an item 606 may be indicated as (3, 7).

Also, the coordinates of the item may be coordinates of a top left point of a region occupied by each item. However, the present disclosure is not limited thereto.

Figure 7A:
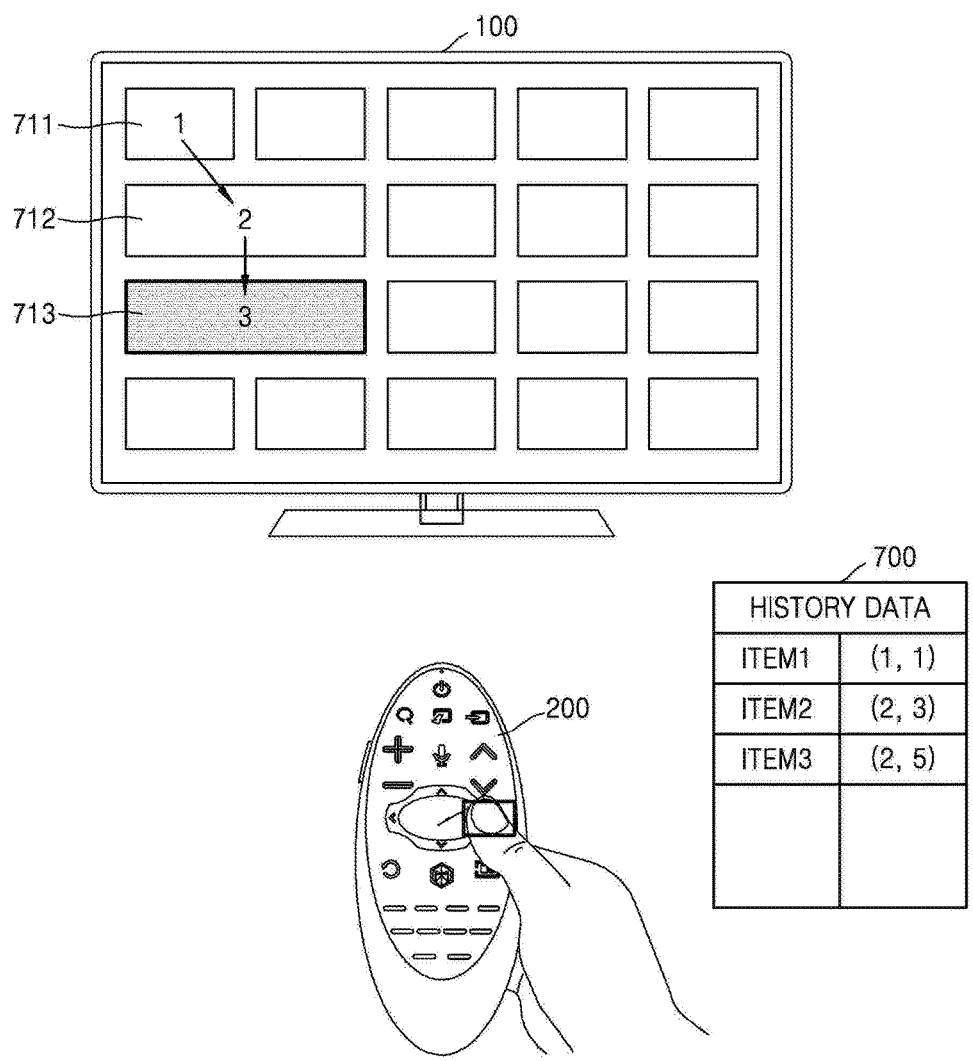
FIGS. 7A and 7B are diagrams of a method of displaying an image according to an exemplary embodiment.
Figure 7B:
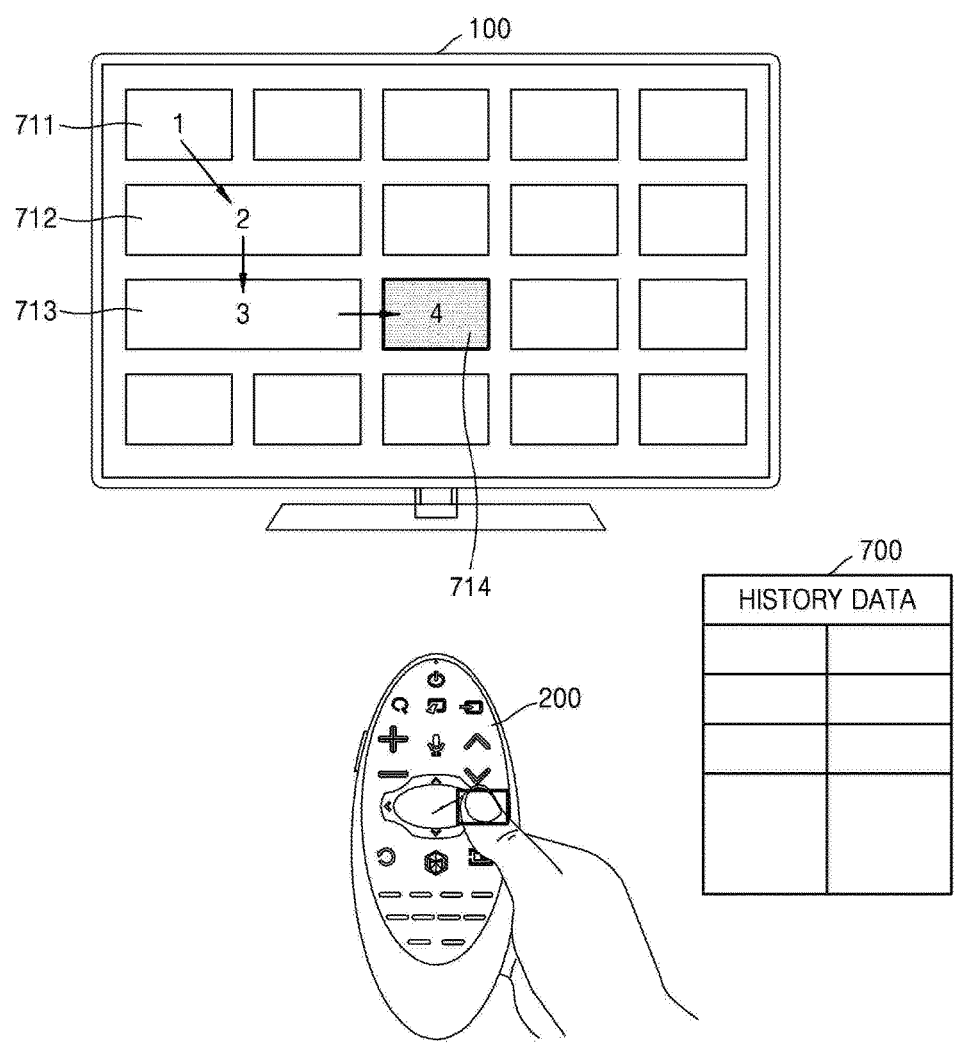

FIGS. 7A and 7B are diagrams showing a case where a direction of a user input is changed on the image display apparatus 100, according to an exemplary embodiment.

Referring to FIG. 7A, the highlight is moved from an item 1 711 to an item 2 712, and is moved from the item 2 712 to an item 3 713, and then is currently located on the item 3 713. While the highlight is being moved from the item 1 711 to the item 3 713, a moving direction of the highlight continues to be a y-axis direction. In this case, the image display apparatus 100 may store coordinates of the item 1 711, the item 2 712, and the item 3 713 as history data 700.

However, as shown in FIG. 7B, when the direction corresponding to the user input is changed to a direction perpendicular to the y-axis direction, the image display apparatus 100 may initialize the history data 700. The image display apparatus 100 may move the highlight to an item 4 714.

After the highlight is moved to the item 4 714, when a user input corresponding to a rightward direction is detected again, the image display apparatus 100 may store coordinates of the item 4 714 as the history data 700.

Accordingly, while the highlight keeps moving in the same direction, coordinates of items through which the highlight has passed may be stored as the history data 700.

In this case, as shown in FIGS. 7A and 7B, the history data 700 may be in a table form, but the present disclosure is not limited thereto.

Figure 8:
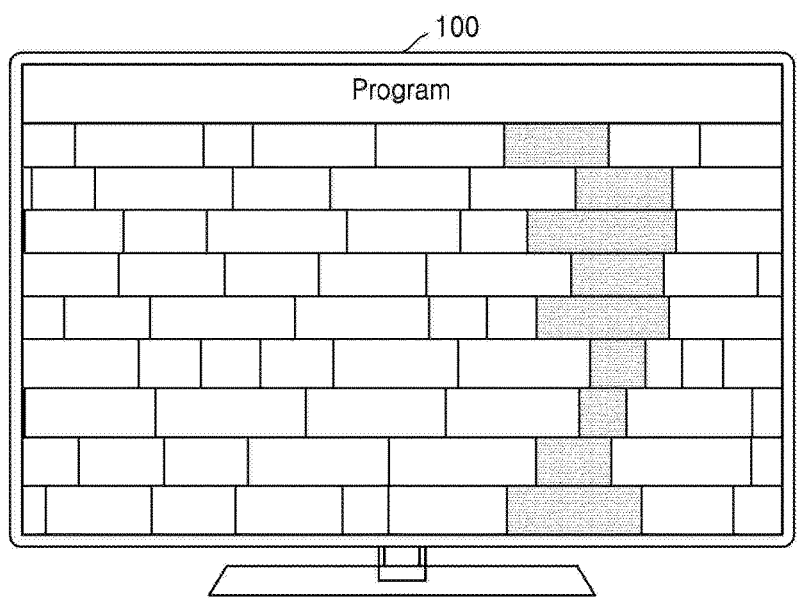
FIG. 8 is a diagram of an example of moving a highlight on an image display apparatus, according to an exemplary embodiment.
Figure 8:
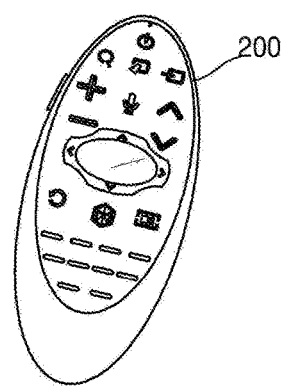

FIG. 8 is a diagram of an example of a method of displaying an image according to an exemplary embodiment.

According to the method of displaying an image, the highlight may be moved based on a current location of the highlight and the information about the moving path of the highlight. Accordingly, the image display apparatus 100 may reduce unnecessary manipulations when the highlight is moved to a location desired by the user. Also, when the items are displayed in a 2D atypical grid form, the image display apparatus 100 may move the highlight according to a user's intention.

Figure 9:
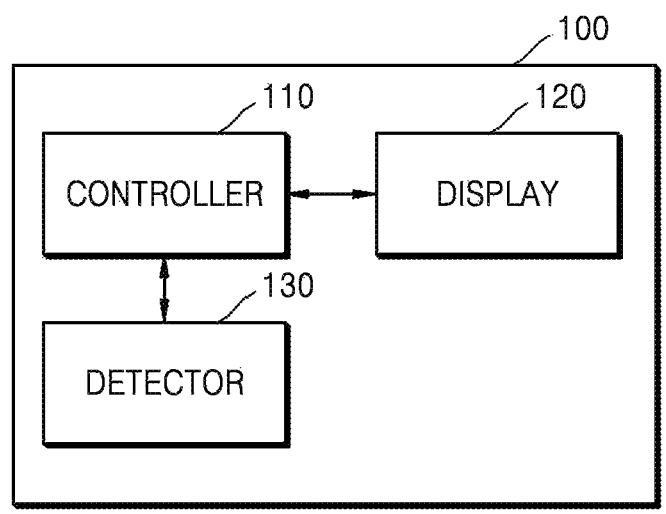
FIG. 9 is a block diagram of a structure of an image display apparatus according to an exemplary embodiment.

FIG. 9 is a block diagram of a structure of the image display apparatus 100 according to an exemplary embodiment.

Referring to FIG. 9, the image display apparatus 100 may include a controller 110, a display 120, and a detector 130. However, not every component shown in FIG. 9 is necessary. The image display apparatus 100 may include more or less components than the components shown in FIG. 9.

The controller 110, the display 120, and the detector 130 will be described.

The display 120 may display items and display an item selected from among the items with a highlight. The items may include an item about programs broadcasted on channels such as an EPG, an image regarding news, and an icon indicating an application. However, the present disclosure is not limited thereto.

Also, the display 120 may display the items in a 2D grid form. The items may be rectangular shaped as shown in FIGS. 4A to 8, but the present disclosure is not limited thereto.

The detector 130 may detect a user input for moving the highlight. In this case, the detector 130 may detect a user input from the control device 200 such as a remote control or a mobile phone. However, the present disclosure is not limited thereto. The user input may be an input corresponding to any one of four directions, that is, upward, downward, leftward, and rightward directions.

The controller 110 may determine candidate items to which the highlight may be moved, in response to the detected user input. In this case, the candidate items to which the highlight may be moved may be items contacting an item on which the highlight is currently located in a direction in which the highlight is moved. For example, when the highlight is moved in a downward direction, the candidate items may be items contacting a bottom portion of the item on which the highlight is currently located.

Also, the controller 110 may select one of the candidate items based on the information about the moving path of the highlight. In this case, the controller 110 may select an item, at which a change in location of the highlight is minimized, in a direction perpendicular to a direction corresponding to the user input.

The information about the moving path of the highlight may include history data and coordinates of the item on which the highlight is currently located. Also, the history data may include coordinates of items on which the highlight was located before the highlight is moved to the current location.

In addition, the change in location of the highlight may be indicated by a variance or a standard deviation regarding the moving path of the highlight. However, the present disclosure is not limited thereto.

Accordingly, the controller 110 may calculate the variance or the standard deviation regarding the moving path of the highlight based on the information about the moving path of the highlight and the coordinates of the candidate items and then may select an item of which a variance or a standard deviation is the smallest.

The controller 110 may select a leftmost item or an uppermost item from among the candidate items when the changes in location of the highlight are the same with regard to each candidate item. However, the present disclosure is not limited thereto. Therefore, when the changes in location of the highlight are the same with regard to each candidate item, an item selected from among the candidate items may differ according to settings.

The controller 110 may initialize the history data as the direction corresponding to the user input is changed to a direction perpendicular to a direction in which the highlight is moved.

The controller 110 may move the highlight to the selected item.

Figure 10:
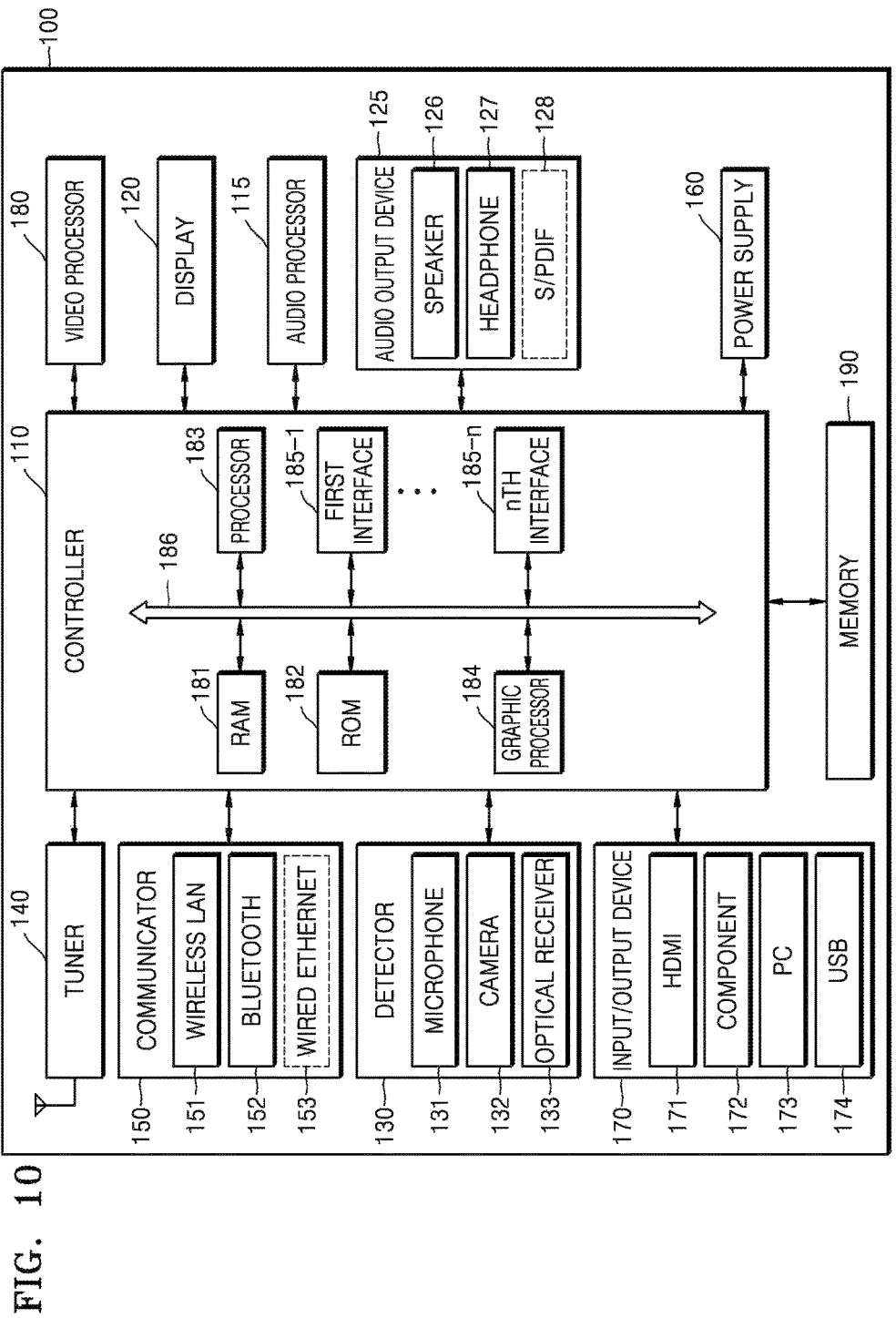
FIG. 10 is a block diagram of a structure of an image display apparatus according to another exemplary embodiment.

FIG. 10 is a block diagram of a structure of the image display apparatus 100 according to another exemplary embodiment.

As shown in FIG. 10, the image display apparatus 100 may further include a video processor 180, an audio processor 115, an audio output device 125, a power supply 160, a tuner 140, a communicator 150, an input/output device 170, and a memory 190 in addition to the controller 110, the display 120, and the detector 130.

The descriptions of the controller 110, the display 120, and the detector 130 that are provided with reference to FIG. 9 will be omitted.

The video processor 180 processes video data received by the image display apparatus 100. The video processor 180 may process the video data in various manners such as decoding, scaling, noise filtering, frame rate conversion, and resolution conversion.

The display 120 displays, on a screen, a video included in broadcast signals received via the tuner 140 under the control of the controller 110. Also, the display 120 may display content (e.g., a moving image) input via the communicator 150 or the input/output device 170. The display 120 may output an image stored in the memory 190 under the control of the controller 110. Also, the display 120 may include a voice user interface (UI) (e.g., a UI including a voice command guide) used to perform a voice recognition task corresponding to voice recognition and a motion UI (e.g., a UI including a user motion guide for motion recognition) used to perform a motion recognition task corresponding to motion recognition).

The audio processor 115 processes audio data. The audio processor 115 may process the audio data in various manners such as decoding, amplification, and noise filtering. The audio processor 115 may include audio processing modules to process audios corresponding to pieces of content.

The audio output device 125 outputs audios included in broadcast signals received via the tuner 140 under the control of the controller 110. The audio output device 125 may output audios (e.g., a voice, a sound, etc.) input via the communicator 150 or the input/output device 170. Also, the audio output device 125 may output an audio stored in the memory 190 under the control of the controller 110. The audio output device 125 may include at least one of a speaker 126, a headphone 127, and a Sony/Philips Digital Interface (S/PDIF) 128. The audio output device 125 may include a combination of the speaker 126, the headphone 127, and the S/PDIF 128.

The power supply 160 supplies power input from an external power source to the components of the image display apparatus 100 under the control of the controller 110. Also, the power supply 160 may supply power that is output from at least one or at least two batteries (not shown), which is included in the image display apparatus 100, to the components of the image display apparatus 100 under the control of the controller 110.

The tuner 140 may tune a frequency of a channel that the image display apparatus desires to receive and select the tuned frequency from among frequency components through amplification, mixing, resonance, etc. of broadcast signals received in wired or wireless manner. In this case, the broadcast signal may include an audio, a video, and additional information (e.g., an EPG).

The tuner 140 may receive broadcast signals in a frequency band corresponding to a channel number (e.g., #506 of a cable TV) according to a user input (e.g., a control signal received from the control device 200, for example, a channel number input, a channel up/down input, and a channel input on an EPG screen).

The tuner 140 may receive broadcast signals from various sources such as terrestrial broadcasting, cable broadcasting, satellite broadcasting, and Internet broadcasting. The tuner 140 may receive broadcast signals from sources such as analog broadcasting or digital broadcasting. The broadcast signals received through the tuner 140 are decoded (e.g., audio decoding, video decoding, or additional information decoding) and are classified into audios, videos, and/or additional information. The audios, the videos, and/or the additional information may be stored in the memory 190 under the control of the controller 110.

There may be one or more tuners 140 in the image display apparatus 100. The tuner 140 may be integrally formed with the image display apparatus 100 or may be embodied as a separate device electrically connected to the image display apparatus 100, for example, a set-top box (not shown) or a tuner (not shown) connected to the input/output device 170.

The communicator 150 may connect the image display apparatus 100 to an external device (e.g., an audio device, etc.) under the control of the controller 110. The controller 110 may receive/transmit content to the external device connected to the image display apparatus 100 through the communicator 150, may download an application from the external device, or may browse a website.

The communicator 150 may include one of a wireless Local Area Network (LAN) 151, Bluetooth 152, and wired Ethernet 153 in accordance with performance and a structure of the image display apparatus 100. Also, the communicator 150 may include a combination of the wireless LAN 151, the Bluetooth 152, and the wired Ethernet 153. The communicator 150 may receive control signals of the control device 200 under the control of the controller 110. The control signal may be embodied as a control signal of a Bluetooth type, a radio frequency (RF) type, or a Wi-Fi type.

For example, the communicator 150 may receive signals corresponding to user inputs of a Bluetooth type (e.g., a touch, a press, a touch gesture, a voice, or a motion) from the control device 200 via Bluetooth 152. The communicator 150 may further include short distance communication (e.g., Near Field Communication (NFC) (not shown) and Bluetooth Low Energy (BLE) (not shown) in addition to the Bluetooth 152.

The detector 130 detects a user's voice, a user's video, or a user's interaction.

The microphone 131 receives utterance of the user. The microphone 131 may convert the received utterance into electrical signals and may output the electrical signals to the controller 110. The utterance of the user may include, for example, a voice corresponding to a menu or function of the image display apparatus 100. A recognition range of the microphone 131 may be within 4 m from a location of the microphone 131 to a location of the user and may differ depending on a voice volume of the user and a surrounding environment (e.g., sounds from a speaker, ambient noise, etc.).

According to exemplary embodiments, the microphone 131 may receive the utterance of the user, or the like and may output received audio data to the controller 110 in such a manner that the controller 110 may use the audio data to identify an identity of the user. The microphone 131 may be integrally formed with or separately formed from the image display apparatus 100. The microphone 131 separately formed from the image display apparatus 100 may be electrically connected thereto through the communicator 150 or the input/output device 170. According to the performance and structure of the image display apparatus 100, the microphone 131 may not be formed therein.

The camera 132 receives an image (e.g., consecutive frames) corresponding to a user's motion including a gesture within a recognition range of the camera 132. For example, the recognition range of the camera 132 between the camera 132 and the user may be from about 0.1 m to about 5 m. The user's motion may include a motion of a body part of the user such as a face, a facial expression, a hand, a fist, or a finger. The camera 132 may convert a moving image received under the control of the controller 110 into electrical signals and may output the electrical signal to the controller 110.

According to exemplary embodiments, the camera 132 may capture an image of a user's face and may output the captured image to the controller in such a manner that the controller 110 may use the captured image to identify the identity of the user who watches the image display apparatus 100.

The controller 110 may select a menu displayed on the image display apparatus 100 based on a result of recognizing a received motion or may control the image display apparatus 100 according to the result of recognizing the received motion. For example, the result of recognizing the received motion may include adjusting a channel or a volume or moving a pointer or a cursor.

The camera 132 may include a lens (not shown) and an image sensor (not shown). The camera 132 may support an optical zoom or a digital zoom by using lenses and image processing processes. A recognition range of the camera 132 may vary with an angle of the camera 132 and surrounding environment conditions. When there are multiple cameras 132, a 3D still image or a 3D motion may be received through the cameras 132.

The camera 132 may be integrally formed with or formed separately formed from the image display apparatus 100. A separate device including the camera 132 that is formed separately formed from the image display apparatus 100 may be electrically connected to the image display apparatus 100 through the communication device 150 or the input/output device 170.

It would have been obvious that the camera 132 may not be included in the image display apparatus 100 according to the performance or structure of the image display apparatus 100.

The optical receiver 133 receives an optical signal (including a control signal) received from the external control device 200 through an optical window of a bezel of the display 120, etc. The optical receiver 133 may receive an optical signal corresponding to a user input (e.g., a touch, a press, a touch gesture, or a motion) from the control device 200. A control signal may be extracted from the optical signal under the control of the controller 110.

According to exemplary embodiments, the optical receiver 133 may receive the optical signal indicating that any one of keys in two directions or four directions of the control device 200 and may transmit the received optical signal to the controller 110.

The input/output device 170 receives a video (e.g., a moving image, etc.), an audio (e.g., an audio, a piece of music, etc.), additional information (e.g., an EPG, etc.), or the like from the outside of the image display apparatus 100 under the control of the controller 110. The input/output device 170 may include one of a High-Definition Multimedia Interface (HDMI) port 171, a component jack 172, a PC port 173, and a USB port 174. The input/output device 170 may include a combination of the HDMI port 171, the component jack 172, the PC port 173, and the USB port 174.

A structure and operations of the input/output device 170 may vary according to exemplary embodiments.

The controller 110 controls overall operations of the image display apparatus 100 and signal flow between components within the image display apparatus 100 and may perform a function of processing data. The controller 110 may execute an operation system (OS) and various applications stored in the memory 190 when there is a user input a preset user input satisfies stored conditions.

The controller 110 may store a signal input from the outside of the image display apparatus 100 or data. Also, the controller 110 may include random access memory (RAM) 181 used as a storage area corresponding to various operations performed by the image display apparatus 100, read only memory (ROM) 182 in which a control program for controlling the image display apparatus 100 is stored, and a processor 183.

The processor 183 may include a graphic processing unit (GPU) (not shown) for processing graphic corresponding to a video. The processor 183 may be embodied as a system on chip (SoC) in which a core (not shown) and the GPU are integrated. The processor 183 may include a single core, a dual core, a triple core, a quad core, and their multiples.

Also, the processor 183 may include multiple processors. For example, the processor 183 may be embodied as a main processor (not shown) and a sub processor (not shown) operating in a sleep mode.

The graphic processor 184 produces a screen including diverse objects such as an icon, an image, and a text by using a calculation unit (not shown) and a rendering unit (not shown). The calculation unit calculates attribute values such as coordinate values, shapes, sizes, and colors according to a layout of a screen, based on the user input detected through the detector 130. The rendering unit generates a screen of layouts including objects based on the attribute values calculated by the calculation unit. The screen generated by the rendering unit is displayed on a display area of the display 120.

First to $n^{th}$ interfaces 185-1 to 185-$n$ are connected to the above-described components. One of the first to $n^{th}$ interfaces 185-1 to 185-$n$ may be a network interface connected to an external device via a network.

The RAM 181, the ROM 182, the processor 183, the graphic processor 184, and the first to $n^{th}$ interfaces 185-1 to 185-$n$ may be interconnected with each other via an internal bus 186.

The term "controller" used herein includes the processor 183, the ROM 182, and the RAM 181.

The memory 190 may store data, programs, or applications for operating and controlling the image display apparatus 100 under the control of the controller 110.

The memory 190 may store history data forming the information about the moving path of the highlight and the coordinates of the item on which the highlight is currently located. The memory 190 may initialize the history data stored in the memory 190 as the direction corresponding to the user input is changed to a direction perpendicular to the direction in which the highlight is moved.

Also, the memory 190 may store input/output signals or data which correspond to operations of the video processor 180, the display 120, the audio processor 115, the audio output device 125, the power supply 160, the tuner 140, the communicator 150, detector 130, and input/output device 170. The memory 190 may store a control program for controlling the image display apparatus 100 and the controller 110, an application that is initially provided by a manufacturer and downloaded from the outside, a graphical user interface (GUI) related to the application, an object (e.g., an image text, an icon, a button, etc.) for providing the GUI, user information, a document, databases, and relevant pieces of data.

The term "memory" used herein includes the memory 190, the ROM 182 and RAM 181 of the controller 110, or a memory card (e.g., a micro SD card, a USB memory, etc.) (not shown) mounted on the image display apparatus 100. Also, the memory 190 may include a non-volatile memory, a volatile memory, a hard disk drive (HDD), and a solid state driver (SSD).

The memory 190 may include a broadcast receiving module, a channel control module, a volume control module, a communication control module, a voice recognition module, a motion recognition module, an optical receiving module, a display control module, an audio control module, an external input control module, a power control module, a power control module of an external device connected in a wireless manner (e.g., Bluetooth), a sound database (DB), or a motion DB, which are not shown. The aforementioned modules and DBs of the memory 190 which are not shown may be embodied in a software form in order to perform, in the image display apparatus 100, a control function of broadcasting reception, a channel control function, a volume control function, a communication control function, a voice recognition function, a motion recognition function, an optical receiving control function, a display control function, an audio control function, an external input control function, a power control function, or a power control function of the external device connected in a wireless manner (e.g., Bluetooth). The controller 110 may perform each of the aforementioned functions by using software stored in the memory 190.

According to exemplary embodiments, the memory 190 may determine candidate items to which the highlight may move in response to a user input for moving the highlight, select one of the candidate items based on information about the moving path of the highlight, and include a module including at least one instruction that moves the highlight to the selected candidate item.

Also, the image display apparatus 100 including the display 120 may be electrically connected to a separate external device (e.g., a set-top box) (not shown) having the tuner 140. For example, the image display apparatus 100 may be embodied as an analog TV, a digital TV, a 3D TV, a smart TV, a light-emitting diode (LED) TV, an organic LED (OLED) TV, a plasma TV, a monitor, or the like. However, the present disclosure is not limited thereto.

The image display apparatus 100 may include a sensor (e.g., an illumination sensor, a temperature sensor, etc.) (not shown) that detects internal and external sensors of the image display apparatus 100.

The block diagrams of the image display apparatus 100 of FIGS. 9 and 10 are examples. The components shown in FIGS. 9 and 10 may be combined or omitted, or additional components may be added to the components shown in FIGS. 9 and 10, according to the specifications of the image display apparatus 100 that is actually embodied. That is, according to necessity, at least two components may be integrated into one component, or one component may be separated into at least two components. Also, functions performed by each block are used to describe exemplary embodiments, and detailed operations or devices regarding the functions do not limit the scope of the present disclosure.

The exemplary embodiments are embodied as computer-readable instructions executable by various computer media and may be recorded in computer-readable recording media. The computer-readable recording media may independently include program instructions, data files, data structures or may include combinations thereof. The program instructions recorded in the computer-readable recording media are specially designed for the present disclosure or may be well known to one of ordinary skill in the art. Examples of the computer-readable recording media include magnetic storage media (e.g., hard disks, floppy disks, magnetic tapes, etc.), optical recording media (e.g., CD-ROMs, or DVDs), magnetic-optical recording media (e.g., floptical disks, etc.), and hardware devices, for example, ROMs, RAMs, flash memories, or the like, which store and execute program instructions. Examples of the program instructions include machine language codes generated by compilers and high-level language codes executable by computers by using interpreters, etc.

It should be understood that exemplary embodiments described herein should be considered in a descriptive sense only and not for purposes of limitation. Descriptions of features or aspects within each exemplary embodiment should typically be considered as available for other similar features or aspects in other exemplary embodiments.

While one or more exemplary embodiments have been described with reference to the figures, it will be understood by those of ordinary skill in the art that various changes in form and details may be made therein without departing from the spirit and scope as defined by the following claims.

What is claimed is:

1. An image display apparatus comprising:
   a display configured to display a plurality of items and display an item selected from among the plurality of items with a highlight;
   a detector configured to detect a user input for moving the highlight in one of an upward direction, a downward direction, a leftward direction, and a rightward direction; and
   a controller configured to determine candidate items to which the highlight is to be moved in response to the user input, select one of the candidate items based on information about a moving path of the highlight, and move the highlight to the selected candidate item,
   wherein the candidate items are adjacent to an item on which the highlight is currently located, in a direction corresponding to the user input, and the direction is one of the upward direction, the downward direction, the leftward direction, and the rightward direction, and wherein the controller is configured to select an item at which a change in location of the highlight in a direction perpendicular to the direction corresponding to the user input is minimized and to select a leftmost item or an uppermost item from among the candidate items when the change in location of the highlight with regard to each of the candidate items is identical.

2. The image display apparatus of claim 1, wherein the controller is configured to calculate a variance or a standard deviation of the moving path of the highlight with regard to each of the candidate items based on the information about the moving path of the highlight and coordinates of the candidate items, and to select an item having a smallest variance or standard deviation from among the candidate items.

3. The image display apparatus of claim 1, wherein the information about the moving path of the highlight comprises history data and coordinates of an item on which the highlight is currently located, and the history data comprises coordinates of items on which the highlight was located before the highlight is moved to a current location.

4. The image display apparatus of claim 3, further comprising a memory configured to store a preset number of pieces of the history data.

5. The image display apparatus of claim 3, wherein the controller is configured to initialize the history data when the direction corresponding to the user input is changed to a direction perpendicular to the direction in which the highlight is moved.

6. The image display apparatus of claim 1, wherein the display is configured to display the plurality of items in a 2-dimensional (2D) grid form.

7. A method of displaying an image, the method comprising:

displaying a plurality of items and displaying an item selected from among the plurality of items with a highlight;

detecting a user input for moving the highlight in one of an upward direction, a downward direction, a leftward direction, and a rightward direction;

determining candidate items to which the highlight is to be moved, in response to the user input;

selecting one of the candidate items based on information about a moving path of the highlight; and moving the highlight to the selected candidate item, wherein the candidate items are adjacent to an item on which the highlight is currently located, in a direction corresponding to the user input, and the direction is one of the upward direction, the downward direction, the leftward direction, and the rightward direction, and wherein the selecting of one of the candidate items comprises selecting an item at which a change in location of the highlight is minimized in a direction perpendicular to the direction corresponding to the user input, and selecting a leftmost item or an uppermost item from among the candidate items when the change in location of the highlight with regard to each of the candidate items is identical.

8. The method of claim 7, wherein the selecting of one of the candidate items further comprises:

calculating a variance or a standard deviation of the moving path of the highlight with regard to each of the candidate items based on the information about the moving path of the highlight and coordinates of the candidate items; and selecting an item having a smallest variance or standard deviation from among the candidate items.

9. The method of claim 7, wherein the information about the moving path of the highlight comprises history data and coordinates of an item on which the highlight is currently located, and the history data comprises coordinates of items on which the highlight was located before the highlight is moved to a current location.

10. The method of claim 9, further comprising:

initializing the history data when a direction corresponding to the user input is changed to a direction perpendicular to the direction in which the highlight is moved.

11. The method of claim 7, wherein the displaying of the plurality of items comprises displaying the plurality of items in a 2-dimensional (2D) grid form.

12. A non-transitory computer-readable recording medium having recorded thereon a program which, when executed by a computer, performs the method of claim 7.

* * * * *